US005541997A

United States Patent [19]

Pappas et al.

[11] Patent Number: 5,541,997

[45] Date of Patent: Jul. 30, 1996

[54] METHOD AND APPARATUS FOR DETECTING CORRECTLY DECRYPTED COMMUNICATIONS

[75] Inventors: Scott J. Pappas, Streamwood; David L. Weiss, Roselle, both of Ill.

[73] Assignee: Motorola, Inc., Schaumburg, Ill.

[21] Appl. No.: 528,367

[22] Filed: Sep. 14, 1995

Related U.S. Application Data

[63] Continuation of Ser. No. 188,876, Jan. 31, 1994, abandoned.

[51] Int. Cl.$^{6}$ .......... H04L 9/00

[52] U.S. Cl. .......... 380/49; 380/48

[58] Field of Search .......... 380/48, 49, 1, 380/23, 50, 9

[56] References Cited

U.S. PATENT DOCUMENTS

| | | | |
|---|---|---|---|
| 4,440,976 | 4/1984 | Bocci et al. | 380/50 X |
| 4,610,025 | 9/1986 | Blum et al. | 380/50 X |
| 4,782,529 | 11/1988 | Shima | 380/50 X |
| 5,201,000 | 4/1993 | Matyas et al. | 380/49 X |
| 5,235,644 | 8/1993 | Gupta et al. | 380/49 X |

OTHER PUBLICATIONS

"Identifying the Cipher Symbols of a Cryptogram from a Partially Incorrect Decryption"; IBM Technical Disclosure Bulletin; vol. 29 No. 3, 1986 Aug.

Chesson, Fredrick W; "Computer Cryptography—How to decipher Secret Messages"; Radio Electronics vol. 48, No. 12 Dec. 1977 pp. 48–50.

*Primary Examiner*—David C. Cain

*Attorney, Agent, or Firm*—Christopher P. Moreno

[57] ABSTRACT

In a receiver (100), an encrypted communication (104) is decrypted using a decryptor (101) and a key (107) to produce a decrypted communication (105). A comparator (103) compares decrypted symbol patterns in the decrypted communication against a set of predetermined symbol patterns (108). When the decrypted symbol patterns are distributed non-uniformly relative to the set of predetermined symbol patterns, the receiver is identified as a target of the encrypted communication.

8 Claims, 2 Drawing Sheets

METHOD AND APPARATUS FOR DETECTING CORRECTLY DECRYPTED COMMUNICATIONS

This is a continuation of application Ser. No. 08/188,876, filed Jan. 31, 1994 and now abandoned.

FIELD OF THE INVENTION

The present invention relates generally to communication systems and, in particular, to a method and apparatus for detecting encrypted communications.

BACKGROUND OF THE INVENTION

Communication systems are known to comprise communication units, such as in-car mobile or hand-held portable radios, as well as a fixed infrastructure, such as base stations and/or controllers. A typical message within such a communication system may begin with a communication unit converting an audio signal into a digital data stream suitable for transmission over an RF (radio frequency) channel to either another communication unit or the fixed infrastructure. Such systems are often used by public safety institutions, such as local or federal law enforcement agencies. The existence of commercially available RF scanners makes it possible for unauthorized parties to monitor the information transmitted within such a communication system. To reduce unauthorized eavesdropping, communication systems encrypt communications such that, without knowledge of the encryption method and a decryptor, the communications are unintelligible.

As is known, digital encryption methods use a reversible algorithm to introduce randomness into a digital data stream. An algorithm that randomizes digital data is called an encryptor; that which reconstructs the original data from the randomized data, a decryptor. An encryptor/decryptor algorithm typically utilizes dynamic parameters, hereafter referred to as keys, to uniquely specify the nature of the randomness introduced to the digital data stream. Thus, only encryptors and decryptors utilizing an identical algorithm and key are capable of communicating intelligible messages.

It is often the case that talkgroups (i.e., a group of logically related communication units configured to receive communications intended for the entire group) are partitioned by key variables on the same channel. For example, if a first talkgroup is partitioned through the use of a first key on a given channel and a second talkgroup is partitioned through the use of a second key on the same channel, encrypted messages intended for the first talkgroup (i.e., messages encrypted with the first encryption key) will be correctly decrypted by communication units within the first talkgroup. In the second talkgroup, however, communication units utilizing the second key will attempt to decrypt the message, resulting in digital streams of unintelligible data. Unless provided a method for detecting the key mismatch, communication units in the second talkgroup will render the unintelligible data audible to their respective users, often resulting in annoyed users.

Prior art solutions to this problem have relied upon the assumption that certain bit patterns are prevalent in digitally represented speech signals. For example, digitized audio signals created through the use of a CVSD (Continuously-Variable Slope-Delta) vocoder are assumed to include significant amounts of idle pattern (i.e., 1010 . . . ), alternating one-zero pairs (i.e., 1100 . . . ), and long one/zero runs (i.e., 11111010000010 . . . ). In these methods, correlations are performed between the decrypted digital data and the desired bit patterns. If there is a high degree of correlation between the decrypted digital data and the desired bit patterns, it is assumed that the message has been correctly decrypted (i.e., the correct key has been used), and the resulting audio is unmuted for presentation to the user. If the degree of correlation is insufficient, the resulting audio is muted.

The previously described methods suffer the shortcoming of being overly strict. That is, they often cause messages that have been correctly decrypted to be muted nonetheless. This is a result of intelligible speech signals that do not contain significant amounts of the desired bit patterns, i.e., speech modulated with high-level background noise. As a result of this shortcoming, it is possible for users to miss entire messages. Therefore, a need currently exists for a method of reliably detecting correctly decrypted communications that overcomes the shortcomings of prior art solutions.

DESCRIPTION OF A PREFERRED EMBODIMENT

Generally, the present invention furnishes a method and apparatus for a receiver to detect encrypted communications for which it is a target. This is accomplished by decrypting, with a decryptor and an encryption key, at least a portion of a received encrypted communication. A comparator is used to compare decrypted symbol patterns in the decrypted communication against a set of predetermined symbol patterns. If the distribution of decrypted symbol patterns is non-uniform relative to the predetermined set of symbol patterns, the encrypted communication has been correctly decrypted and, pursuant to this result, the receiver is identified as a target of the encrypted communication. With such a method, a receiver is able to more reliably detect and decrypt encrypted communications intended for the receiver.

Figure 1:
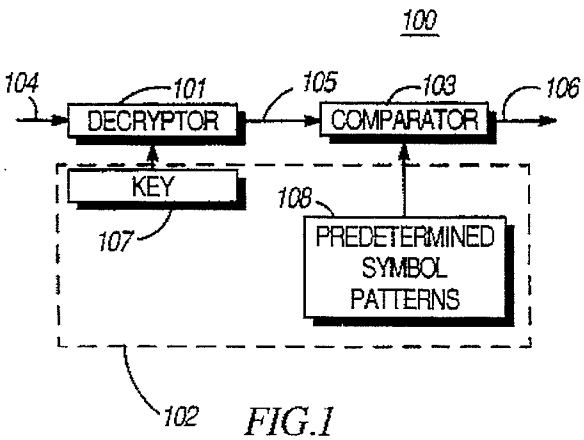
FIG. 1 illustrates a preferred embodiment of a receiver in accordance with the present invention.

The present invention can be more fully described with reference to FIGS. 1–4. FIG. 1 illustrates a preferred embodiment of a receiver (100) that includes a decryptor (101), a database (102), and a comparator (103). At least one encryption key (107) and a set of predetermined symbol patterns (108) are stored in the database (102). Configured as shown, the decryptor (101) receives an encrypted communication (104) and produces a decrypted communication (105) utilizing the key (107). The comparator (103) uses the decrypted communication (105) and the predetermined symbol patterns (108) to produce a decryption status (106) that indicates whether or not the encrypted communication (104) has been correctly decrypted.

The receiver (100) may comprise a portion of any communication device that uses decryption as a part of the receiving process, and where the characteristics of the plain text information (i.e., unencrypted data) are not random. Communication devices such as land mobile radios, telephones, radio telephones, computers, or any other entities in which encrypted communications are used may make use of the present invention.

As an example, assume that the encrypted communication (104) has been generated within a SECURENET™ radio system, i.e., using a 12 Kbit CVSD vocoder. If the Data Encryption Standard (DES) has been used for encryption, the encrypted communication (104) is a 12 Kbit data stream that can be decrypted with the proper key (107) and a DES encryption/decryption device (101) as manufactured by Motorola, Inc. Operation of the receiver (100) is further discussed with reference to FIG. 2.

Figure 2:
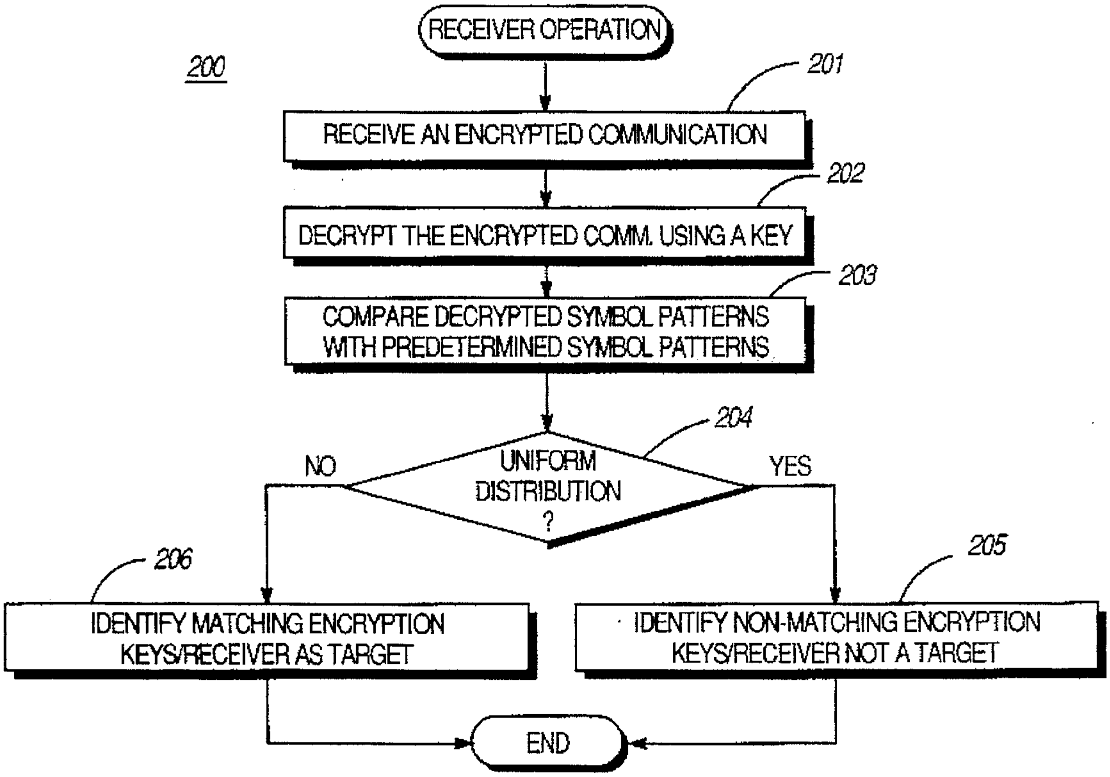
FIG. 2 illustrates a flow chart that may be incorporated by a receiver to implement the present invention.

FIG. 2 illustrates a flow chart that may be incorporated by a receiver to implement the present invention. At step 201 an encrypted communication is received. In the context of the present invention, an encrypted communication is assumed to be in the form of a stream of digital data symbols (e.g., bits). It is understood that the encrypted communication can be conveyed using any one of a number of transmission media (i.e., digital signals through a land-based telephone line or a digitally modulated RF channel).

The encrypted communication is decrypted (202) based on a key input to the decryption process. To ensure proper decryption, the decryption key used to decrypt the encrypted communication must be substantially identical to the encryption key used to encrypt the encrypted communication. Proper, or correct, decryption results when information output by the decryption process is substantially identical to information input to the associated encryption process. As is known, properly decrypted symbol patterns for speech signals will be non-random. That is, the likelihood of specific n-bit symbols occurring in a decrypted communication is greater than the likelihood of other n-bit symbols occurring in the decrypted communication, thus resulting in a non-uniform distribution of decrypted symbol patterns. Conversely, use of the improper key variable will result in pseudorandom symbol patterns. That is, the likelihood of a specific n-bit symbol occurring in a decrypted communication is no greater than the likelihood of any other n-bit symbol occurring in the decrypted communication, thus resulting in a uniform distribution of decrypted symbol patterns. This property of an improperly decrypted communication is fundamental to the proper operation of the present invention, described in further detail below.

The decrypted symbol patterns obtained in step 202 are compared (203) to a set of predetermined symbol patterns (PSP's). (Relative to FIG. 1, this operation would take place in the comparator (103).) In a preferred embodiment, the PSP's are chosen such that all possible n-bit symbol patterns lie in the set of PSP's. For example, assuming binary data and 4-bit symbols, a total of 16 symbol patterns would lie in the set of PSP's. It is understood that, depending on the characteristics of the decrypted symbol patterns, it is possible for the set of PSP's to include only a subset of all possible patterns. Additionally, the bit-length of the PSP's could be larger or smaller, depending on the particular application.

The comparison of step 203 is tantamount to developing a histogram that charts the occurrence of each PSP in the decrypted communication. In one method for developing such a histogram, successive decrypted symbol patterns are compared with each PSP until a match is found. For each occurrence of a match, a counter associated with the matching PSP is incremented by one. This process is repeated until an appropriate amount of decrypted symbol patterns have been compared to provide a reliable assessment of the distribution of the decrypted symbol patterns. Using the previous example of binary, 4-bit PSP's, an "appropriate amount" of comparisons could be a minimum of 1600 (i.e., at least 100 per available PSP).

At step 204, it is determined if the distribution of symbol patterns, obtained at step 203, is uniform. If the distribution of symbol patterns is ideally uniform, the probability of occurrence of a particular PSP is defined as 1 divided by the number of possible PSP's, described mathematically below:

$$P(x_i)=1/N$$

where N is the number of PSP's in the set, and $x_i$ is the occurrence of the i'th PSP ($1 \leq i \leq N$).

Consider random decrypted symbol patterns having N different possible symbol patterns and M comparisons performed. For the decrypted symbol patterns to be distributed uniformly, each possible symbol pattern will have the same number of occurrences if M is sufficiently large. This number is given by the mean (E[x]) of the process, ideally defined as:

$$E[x]=M/N$$

As known in the art, the actual distribution taken from a decrypted communication would deviate from the ideal somewhat even though the symbol pattern may be random. As the number of comparisons (M) gets larger, 0 the distribution of symbol patterns for an improperly decrypted communication becomes increasingly uniform, i.e., ideal uniform distribution as M approaches infinity. Due to the real time nature of many systems, M must be finite and much less than infinity. This finite number of comparisons introduces some variation about the mean in the distribution. This is often referred to as "noise" in the distribution.

To compensate for this "noise", a threshold must be set above and below the ideal number of occurrences (E[x]) for each PSP. If the number of occurrences for any one PSP included in the set is greater than the upper threshold or less than the lower threshold, then the distribution of symbol patterns is considered non-uniform. If the number of occurrences for each PSP included in the set lies between the thresholds, then the distribution of symbol patterns is considered uniform. This is discussed in greater detail with reference to FIGS. 3 and 4 below.

Continuing with FIG. 2, if the distribution of the decrypted symbol patterns is substantially uniform (204), it is accepted that the decrypted communication (assuming that the communication comprises speech signals) has lost the distribution characteristics of the original communication prior to encryption (205). This may be due to an excessively noisy communications channel or decryption with an improper key. If receivers targeted for the communication are determined by the encryption/decryption key used, then this result may indicate that the receiver is not a target for the communication.

If, however, the distribution of the decrypted symbol patterns is substantially non-uniform (204), it is accepted that the decryption process has occurred correctly—indicating that the encryption and decryption keys used were identical—and that the original communication has been properly recovered (206). It is noted that in the case of public encryption/decryption keys, a non-uniform distribution of decrypted symbol patterns does not imply that the decryption key used is strictly identical to the encryption key used. Assuming once again that receivers targeted for the communication are determined by the encryption/decryption key used, the non-uniform distribution of decrypted symbol patterns indicates that the receiver is a target for the communication. Those skilled in the art will recognize that prior art solutions used to determine proper decryption relied upon characteristics of correctly decrypted speech, which characteristics could often be masked by the presence of an excessively noise communication channel, for instance. In contrast, the present invention relies upon characteristics of incorrectly decrypted speech, which characteristics are not easily masked, thus providing an improved method for determining proper decryption.

Figure 3:
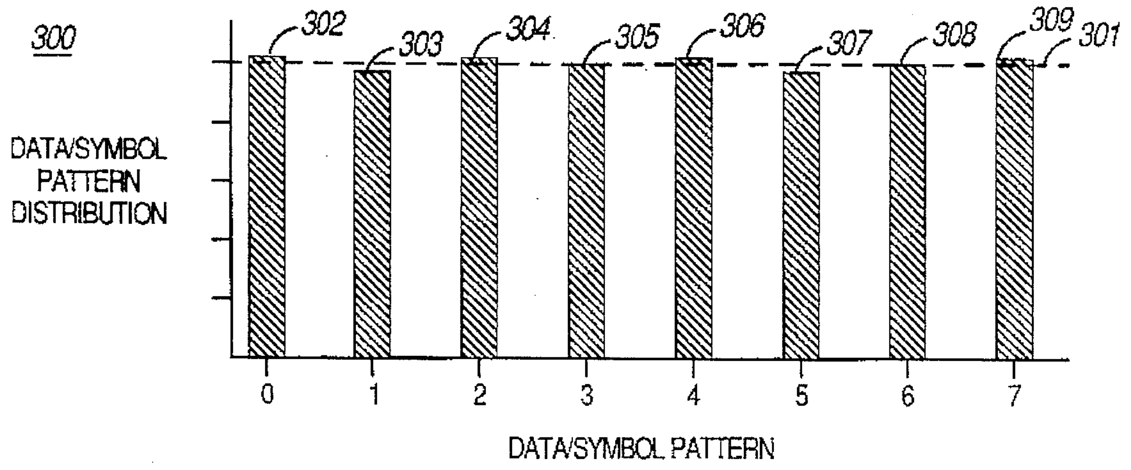
FIG. 3 illustrates an exemplary symbol pattern distribution resulting from an incorrectly decrypted communication.
Figure 4:
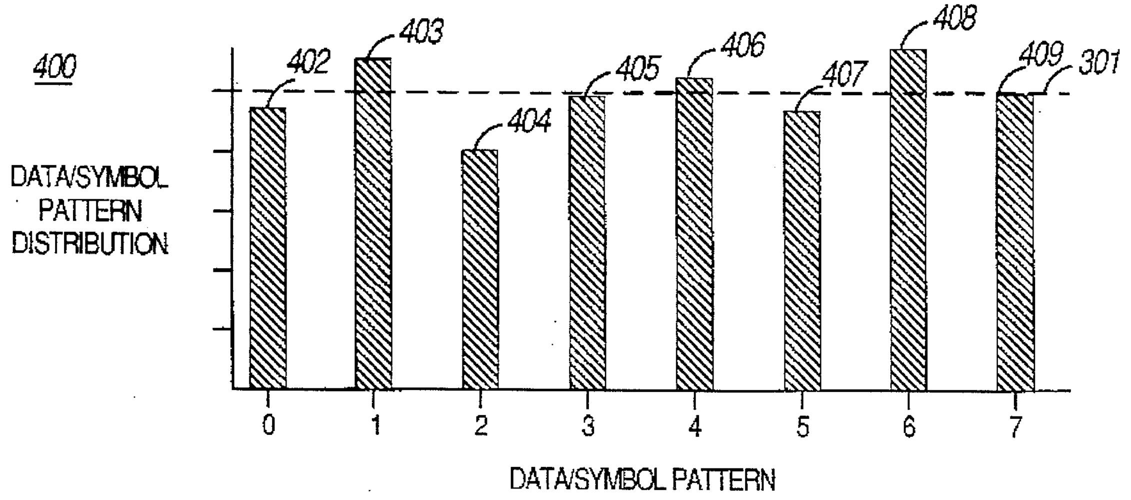
FIG. 4 illustrates an exemplary symbol pattern distribution resulting from an correctly decrypted communication.

FIGS. 3 and 4 illustrate examples of symbol pattern distributions resulting from decrypted communications that have been incorrectly and correctly decrypted (300, 400), respectively. In these examples, binary, 3-bit symbol patterns are used resulting in 8 predetermined symbol patterns. As mentioned previously, the number of occurrences of each predetermined symbol pattern is ideally equally likely because an improperly decrypted communication is ideally purely random. In the example of FIGS. 3 and 4, the ideal number of occurrences of each predetermined symbol pattern for random data is given by the mean as noted below:

$$E[x]=M/8$$

where M is once again the number of decrypted symbol patterns compared against the set of predetermined symbol patterns. This mean value is indicated by the reference numeral 301 in the figures.

Assuming that 2400 decrypted symbol patterns are compared against the 8 possible predetermined symbol patterns, the mean (301) is equal to 300. Further assuming that the upper and lower thresholds are respectively greater and less than the mean (301) by 10 percent, the upper threshold is set at 330 and the lower threshold is set at 270. As shown if FIG. 3, none of the number of occurrence of each predetermined symbol pattern (302 309) is greater or less than the thresholds, thus indicating that the decrypted symbol patterns are uniformly distributed.

In contrast, FIG. 4 illustrates a case in which the decrypted symbol patterns have a non-uniform distribution. Assuming the same values for the mean (301) and the upper and lower thresholds, the number of occurrences for predetermined symbol pattern 1 (403) and predetermined symbol pattern 6 (408) are greater than the upper threshold, and the number of occurrences for predetermined symbol pattern 2 (404) is less than the lower threshold, thus indicating that the decrypted symbol patterns have a non-uniform distribution.

The present invention furnishes a method and apparatus for a receiver to detect a correctly decrypted communication, and thus determine if a receiver is a target of the communication. Prior art methods rely upon the fact that certain symbol patterns are always present in correctly decrypted speech. As this characteristic is not always true in high background noise or weak signal situations, such prior art solutions provided inadequate performance. The present invention offers an improvement over prior art solutions because it does not assume that any particular patterns are present in correctly decrypted speech. The present invention does assume, in comparison, that all symbol patterns included in a set of predetermined symbol patterns are equally likely to be present if the communication is incorrectly decrypted. Thus, the present invention is able to operate more reliably in a wide variety of conditions.

We claim:

1. In a receiver that includes a decryptor and at least one decryption key, a method for determining whether the receiver is a target for an encrypted communication, the method comprises the steps of:

a) receiving the encrypted communication;

b) decrypting at least a portion of the encrypted communication by the decryptor using a decryption key of the at least one decryption key to produce a decrypted communication;

c) comparing decrypted symbol patterns of the decrypted communication with a set of predetermined symbol patterns, wherein each decrypted symbol pattern comprises n-bits and the set of predetermined symbol patterns includes all possible n-bit symbol patterns; and d) when the decrypted symbol patterns are substantially non-uniform in comparison with the set of predetermined symbol patterns, identifying the receiver as a target of the encrypted communication.

2. The method of claim 1 further comprises the step of:

e) when the decrypted symbol patterns are substantially uniform in comparison with the set of predetermined symbol patterns, determining that the receiver is not a target of the encrypted communication.

3. In the method of claim 1, step (c) further comprises comparing the decrypted symbol patterns and the set of predetermined symbol patterns, wherein each symbol pattern of the decrypted symbol patterns and each symbol pattern of the set of predetermined symbol patterns is at least three bits.

4. In the method of claim 1, step (d) further comprises identifying the receiver as a target of the encrypted communication by rendering the decrypted communication audible.

5. In a receiver that includes a decryptor and a stored decryption key, a method for decrypting an encrypted communication, the method comprises the steps of:

a) receiving the encrypted communication;

b) decrypting at least a portion of the encrypted communication using the stored decryption key to produce a decrypted communication;

c) calculating a distribution of symbol patterns of the decrypted communication, wherein the distribution of symbol patterns includes all possible n-bit symbol patterns; and d) when the distribution of symbol patterns is substantially non-uniform for the decrypted communication, indicating that the stored decryption key properly decrypted the encrypted communication.

6. The method of claim 5 further comprises the step of:

e) when the distribution of symbol patterns is substantially uniform for the decrypted communication, identifying the stored decryption key as an improper decryption key for decrypting the encrypted communication.

7. In the method of claim 5, step (d) further comprises indicating that the stored decryption key properly decrypted the encrypted communication by rendering the decrypted communication audible.

8. A receiver comprising:

a decryptor that utilizes a decryption key to decrypt an encrypted communication, wherein the decryptor produces a decrypted communication;

a database that includes a set of predetermined symbol patterns; and a comparator, operably coupled to the decryptor and the database, that compares decrypted symbol patterns of the decrypted communication with the set of predetermined symbol patterns, wherein each decrypted symbol pattern comprises n-bits and the set of predetermined symbol patterns includes all possible n-bit symbol patterns, and, when the decrypted symbol patterns are substantially non-uniform in comparison with the set of predetermined symbol patterns, indicates that the receiver is a target of the encrypted communication.

* * * * *